United States Patent
Gibson et al.

(10) Patent No.: US 10,823,078 B2
(45) Date of Patent: Nov. 3, 2020

(54) SYSTEMS AND METHODS FOR STARTING A TURBINE ENGINE

(71) Applicant: General Electric Company, Schenectady, NY (US)

(72) Inventors: Nathan Evan McCurdy Gibson, West Chester, OH (US); Christopher James Kroger, West Chester, OH (US); Sean Christopher Binion, Loveland, OH (US); Scott Douglas Waun, Loveland, OH (US)

(73) Assignee: General Electric Company, Schenectady, NY (US)

( * ) Notice: Subject to any disclaimer, the term of this patent is extended or adjusted under 35 U.S.C. 154(b) by 461 days.

(21) Appl. No.: 15/635,574

(22) Filed: Jun. 28, 2017

(65) Prior Publication Data

US 2019/0003398 A1  Jan. 3, 2019

(51) Int. Cl.
| | |
|---|---|
| *F02C 7/268* | (2006.01) |
| *F02C 7/275* | (2006.01) |
| *F02C 3/04* | (2006.01) |
| *H02J 7/00* | (2006.01) |
| *H01G 4/38* | (2006.01) |
| *H02K 11/00* | (2016.01) |
| *F02C 7/26* | (2006.01) |
| *B64D 27/10* | (2006.01) |
| *B64F 1/34* | (2006.01) |
| *H02J 3/38* | (2006.01) |

(Continued)

(52) U.S. Cl.
CPC .............. *F02C 7/268* (2013.01); *B64D 27/10* (2013.01); *B64D 33/00* (2013.01); *B64F 1/34* (2013.01); *F02C 3/04* (2013.01); *F02C 7/26* (2013.01); *F02C 7/275* (2013.01); *H01G 4/38* (2013.01); *H02J 3/386* (2013.01); *H02J 7/0068* (2013.01); *H02K 11/0094* (2013.01); *B64C 39/024* (2013.01); *B64C 2201/048* (2013.01); *B64C 2201/206* (2013.01); *B64D 5/00* (2013.01); *B64D 2221/00* (2013.01); *F05D 2220/323* (2013.01); *F05D 2220/76* (2013.01); *F05D 2240/60* (2013.01); *F05D 2260/85* (2013.01); *H01G 4/40* (2013.01); *H02J 7/345* (2013.01)

(58) Field of Classification Search
CPC .. F02C 7/26; F02C 7/268; F02C 7/275; F05D 2260/85
See application file for complete search history.

(56) References Cited

U.S. PATENT DOCUMENTS

| | | |
|---|---|---|
| 5,480,107 A | 1/1996 | Bacon |
| 6,625,504 B2 | 9/2003 | Landreth |

(Continued)

FOREIGN PATENT DOCUMENTS

CN          206283278 U    *    6/2017    ................ H02J 7/00

OTHER PUBLICATIONS

English-language translation of CN206283278U (Year: 2017).*

*Primary Examiner* — Scott J Walthour
(74) *Attorney, Agent, or Firm* — Dority & Manning, P.A.

(57) ABSTRACT

Systems and methods for starting a powerplant are provided. In one exemplary aspect, a starting system of a powerplant includes one or more features that allow for the powerplant to be started electrically with a burst of electrical power and without deriving electrical power from an offboard power source or a relatively heavy onboard energy storage device.

13 Claims, 6 Drawing Sheets

(51) Int. Cl.
*B64D 33/00* (2006.01)
*B64C 39/02* (2006.01)
*B64D 5/00* (2006.01)
*H01G 4/40* (2006.01)
*H02J 7/34* (2006.01)

(56) References Cited

U.S. PATENT DOCUMENTS

| | | |
|---|---|---|
| 6,639,328 B2 | 10/2003 | Wacknov |
| 6,777,822 B1 | 8/2004 | Suttie et al. |
| 6,787,933 B2 | 9/2004 | Claude et al. |
| 6,881,027 B2 | 4/2005 | Klaass et al. |
| 7,251,942 B2 | 8/2007 | Dittmar et al. |
| 7,367,193 B1 | 5/2008 | Thompson |
| 7,704,110 B2 | 4/2010 | Wiatrowski et al. |
| 7,707,838 B2 | 5/2010 | Sheldon et al. |
| 7,725,236 B2 | 5/2010 | Delaloye et al. |
| 7,748,209 B1 | 7/2010 | Schopf et al. |
| 7,806,095 B2 | 10/2010 | Cook et al. |
| 8,261,527 B1 | 9/2012 | Stearns et al. |
| 8,302,403 B2 | 11/2012 | Engle et al. |
| 8,310,076 B2 | 11/2012 | Jones et al. |
| 8,549,833 B2 | 10/2013 | Hyde et al. |
| 8,622,342 B2 | 1/2014 | Filho |
| 8,657,227 B1 | 2/2014 | Bayliss et al. |
| 8,757,542 B2 | 6/2014 | Hopdjanian et al. |
| 8,857,191 B2 | 10/2014 | Hyde et al. |
| 8,927,905 B1 | 1/2015 | Sunday |
| 9,267,437 B2 | 2/2016 | Perry et al. |
| 9,267,438 B2 | 2/2016 | Dooley et al. |
| 9,303,566 B2 | 4/2016 | Haillot |
| 9,366,182 B2 | 6/2016 | Rodriguez et al. |
| 9,404,419 B2 | 8/2016 | Haillot |
| 9,458,770 B2 | 10/2016 | Anghel et al. |
| 9,666,379 B2 | 5/2017 | Postiglione |
| 2007/0018035 A1 | 1/2007 | Saiz et al. |
| 2009/0302152 A1 | 12/2009 | Knight |
| 2013/0013222 A1 | 1/2013 | Gu et al. |
| 2014/0145028 A1 | 5/2014 | Gomez |
| 2014/0260306 A1 | 9/2014 | Dooley et al. |
| 2014/0339371 A1* | 11/2014 | Yates ............... B64D 39/00 244/53 R |
| 2015/0089921 A1 | 4/2015 | Rideau et al. |
| 2015/0091478 A1* | 4/2015 | Marzano ............... B60L 7/28 318/135 |
| 2015/0322864 A1 | 11/2015 | Dooley et al. |
| 2015/0345396 A1 | 12/2015 | Zelesky et al. |
| 2016/0053690 A1 | 2/2016 | Perkinson et al. |
| 2016/0153326 A1 | 6/2016 | Muller et al. |
| 2016/0161120 A1 | 6/2016 | Saxena et al. |
| 2016/0229513 A1 | 8/2016 | Scheel et al. |
| 2017/0089261 A1 | 3/2017 | Bourne et al. |
| 2017/0225794 A1* | 8/2017 | Waltner ............... F01D 15/12 |
| 2018/0058330 A1* | 3/2018 | Munevar ............... F02C 7/275 |
| 2018/0346225 A1* | 12/2018 | Winkle ............... B65D 81/18 |
| 2019/0348857 A1* | 11/2019 | Dudar ............... H02J 7/14 |

* cited by examiner

SYSTEMS AND METHODS FOR STARTING A TURBINE ENGINE

FIELD

The present subject matter relates generally to turbine engines. More particularly, the subject matter relates to systems and methods for starting turbine engines.

BACKGROUND

Turbine engines with a fast start requirement typically need a short but powerful burst of electric power to start, and consequently, a large battery or significant power source has conventionally been required for such starts. For instance, for turbine engines for aircraft, large battery systems, auxiliary power units, and other energy storage/generation units have been used as power sources for fast starting such turbine engines. Such systems are a weight penalty on the turbine engine. Additionally, a starter can typically only draw power from such battery systems and other energy storage/generation units at a slow rate. A slow power draw can frustrate the fast start requirement and can be harsh on the air bearings and rotordynamics of the turbine engine. Moreover, certain turbine engines for aircraft are started via a power source offboard of the aircraft, such as a line voltage connected to the grid. However, fast starting a turbine engine typically requires more power than is easily supplied from such offboard power sources. As a result, significant offboard power sources have typically been needed. Significant offboard power sources can be expensive, bulky, and non-mobile.

Therefore, improved systems and methods for starting turbine engines would be useful. More specifically, improved systems and methods for starting turbine engines with fast start requirements would be beneficial.

BRIEF DESCRIPTION

Aspects and advantages of the invention will be set forth in part in the following description, or may be obvious from the description, or may be learned through practice of the invention.

In one exemplary aspect, the present disclosure is directed to a method for fast starting a powerplant for a vehicle. The powerplant includes a starter and a capacitive accumulator in electrical communication with the starter. The powerplant further includes a shaft. The starter is operably coupled with the shaft. The method includes: charging the capacitive accumulator to a predetermined charge with a power source disposed offboard of the vehicle; disconnecting the capacitive accumulator from the power source such that the capacitive accumulator and the power source are no longer in electrical communication; and discharging at least a portion of the predetermined charge from the capacitive accumulator to deliver an amount of electrical power to the starter such that the starter drives the shaft to a predetermined rotational speed.

In another exemplary aspect, the present disclosure is directed to a turbine engine. The turbine engine includes a compressor, a turbine, and a shaft coupling the compressor and the turbine. The turbine engine also includes a starting system. The starting system includes a starter operably coupled with the shaft and operatively configured to drive the shaft during a starting operation. The starting system further includes a capacitive accumulator in electrical communication with the starter and operatively configured to discharge a predetermined amount of electric power to the starter during the starting operation. In such embodiments, the capacitive accumulator is selectively in electrical communication with a power source positioned offboard of the turbine engine for charging the capacitive accumulator.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
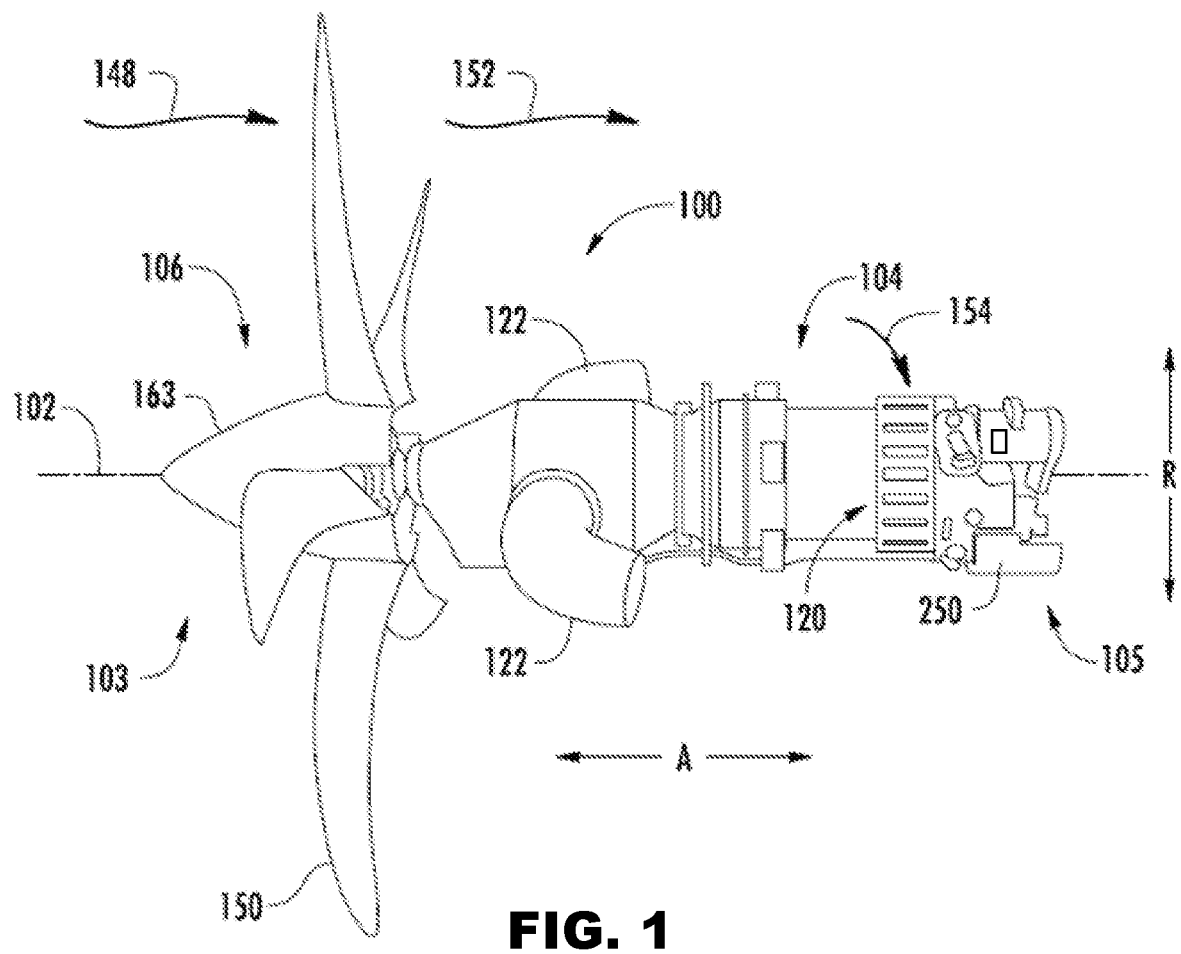
FIG. 1 provides a side view of an exemplary gas turbine engine according to an exemplary embodiment of the present disclosure.

Reference now will be made in detail to embodiments of the present disclosure, one or more example(s) of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations that come within the scope of the appended claims and their equivalents.

Exemplary aspects of the present disclosure are directed to systems and methods for starting a powerplant. More particularly, exemplary aspects are directed to systems and methods for electrically starting a powerplant with a fast start requirement. In one exemplary aspect, a starting system of an exemplary powerplant (e.g., a turbine engine) for a vehicle includes one or more features that allow for the powerplant to be started electrically with a burst of electrical power and without being connected to an offboard power source or a relatively large or heavy onboard energy storage device.

More specifically, in some exemplary embodiments, the powerplant can include a starter and a capacitive accumulator in electrical communication with the starter. The capacitive accumulator can be charged with a low rate offboard power source, for example. Once charged, the capacitive accumulator can be disconnected from the offboard power source. As the capacitive accumulator can hold its charge for a predetermined period, the powerplant can be started without being directly connected to the offboard power source. Moreover, large and heavy energy storage systems are not needed to supply power to the starter as the capacitive accumulator can hold a significant charge. During an engine start operation, the electric starter draws or derives an amount of accumulated electric power from the capacitive accumulator. As the capacitive accumulator can discharge electrical power rapidly, the starter can draw a burst of electrical power such that the electric starter can drive a shaft of the powerplant to a predetermined rotational speed. Further aspects and advantages of the present subject matter will be apparent to those of skill in the art.

Exemplary aspects of the present disclosure will be discussed in further detail with reference to the drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. "HP" denotes high pressure and "LP" denotes low pressure. Further, as used herein, the terms "axial" or "axially" refer to a dimension along a longitudinal axis of an engine. The term "forward" used in conjunction with "axial" or "axially" refers to a direction toward the leading end of the engine and the term "rear" used in conjunction with "axial" or "axially" refers to a direction toward the trailing end of the engine. The terms "radial" or "radially" refer to a dimension extending between a center longitudinal axis (or centerline) of the engine and an outer engine circumference. Radially inward is toward the longitudinal axis and radially outward is away from the longitudinal axis.

Figure 2:
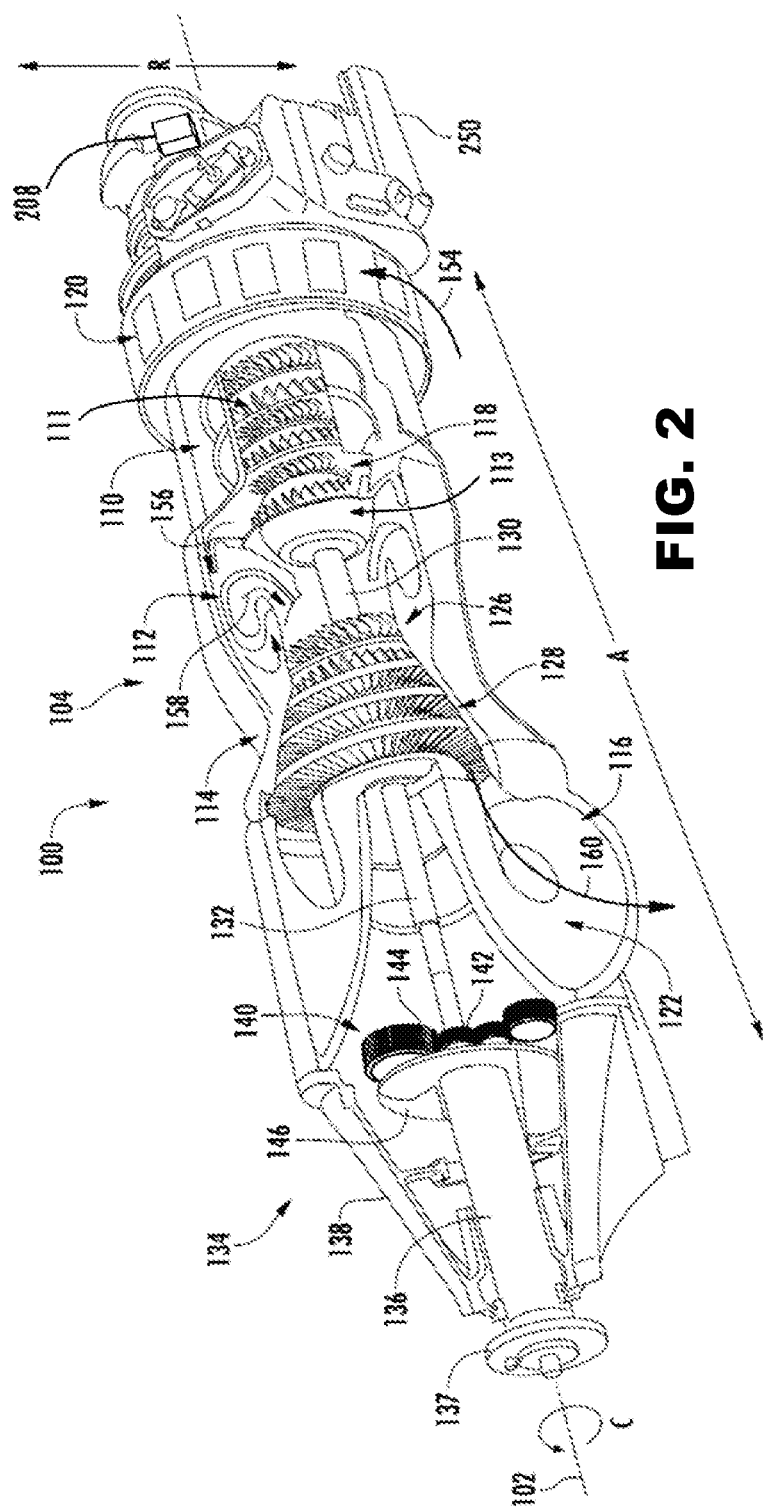
FIG. 2 provides a perspective, cutaway view of the gas turbine engine of FIG. 1 according to an exemplary embodiment of the present disclosure.

Turning now to the drawings with reference to FIGS. 1 and 2, FIG. 1 provides a side view of an exemplary powerplant and FIG. 2 provides a perspective, cutaway view of the powerplant of FIG. 1 according to an exemplary embodiment of the present disclosure. As shown in FIG. 1, for this embodiment, the powerplant is a gas turbine engine 100 configured as a turboprop engine. The gas turbine engine 100 defines an axial direction A, a radial direction R, and a circumferential direction C (FIG. 2) disposed about the axial direction A. The gas turbine engine 100 extends generally along the axial direction A between a first end 103 and a second end 105, which for this embodiment is the forward and aft end, respectively. The gas turbine engine 100 generally includes a gas generator or core turbine engine 104 and a propeller assembly 106 rotatable about the axial direction A. The gas turbine engine 100 defines an axial centerline 102 extending through the core turbine engine 104 and the propeller assembly 106 along the axial direction A.

As shown in FIG. 2, the core turbine engine 104 generally includes, in serial flow arrangement, a compressor section 110, a combustion section 112, a turbine section 114, and an exhaust section 116. A core air flowpath 118 extends from an annular inlet 120 to one or more exhaust outlets 122 of the exhaust section 116 such that the compressor section 110, combustion section 112, turbine section 114, and exhaust section 116 are in fluid communication.

The compressor section 110 can include one or more compressors, such as a high pressure compressor (HPC) and a low pressure compressor (LPC). For this embodiment, the compressor section 110 includes a four-stage axial LPC 111 and a single centrifugal HPC 113. The LPC 111 includes sequential stages of compressor stator vanes and rotor blades (not labeled) and the HPC 113 is an impeller positioned downstream of the axial stages of stator vanes and rotor blades. The combustion section 112 includes a reverse-flow combustor (not labeled) and one or more fuel nozzles (not shown). The turbine section 114 may define one or more turbines, such as a high pressure turbine (HPT) and a low pressure turbine (LPT). For this embodiment, the turbine section 114 includes a two-stage gas generator turbine 126 for driving the compressor section 110. The gas generator turbine 126 includes two sequential stages of stator vanes and turbine blades (not labeled). The turbine section 114 also includes a three-stage free or power turbine 128 that drives a propeller gearbox 134, which in turn drives the propeller assembly 106 (FIG. 1). The exhaust section 116 includes one or more exhaust outlets 122 for routing the combustion products to the ambient air.

Figure 3:
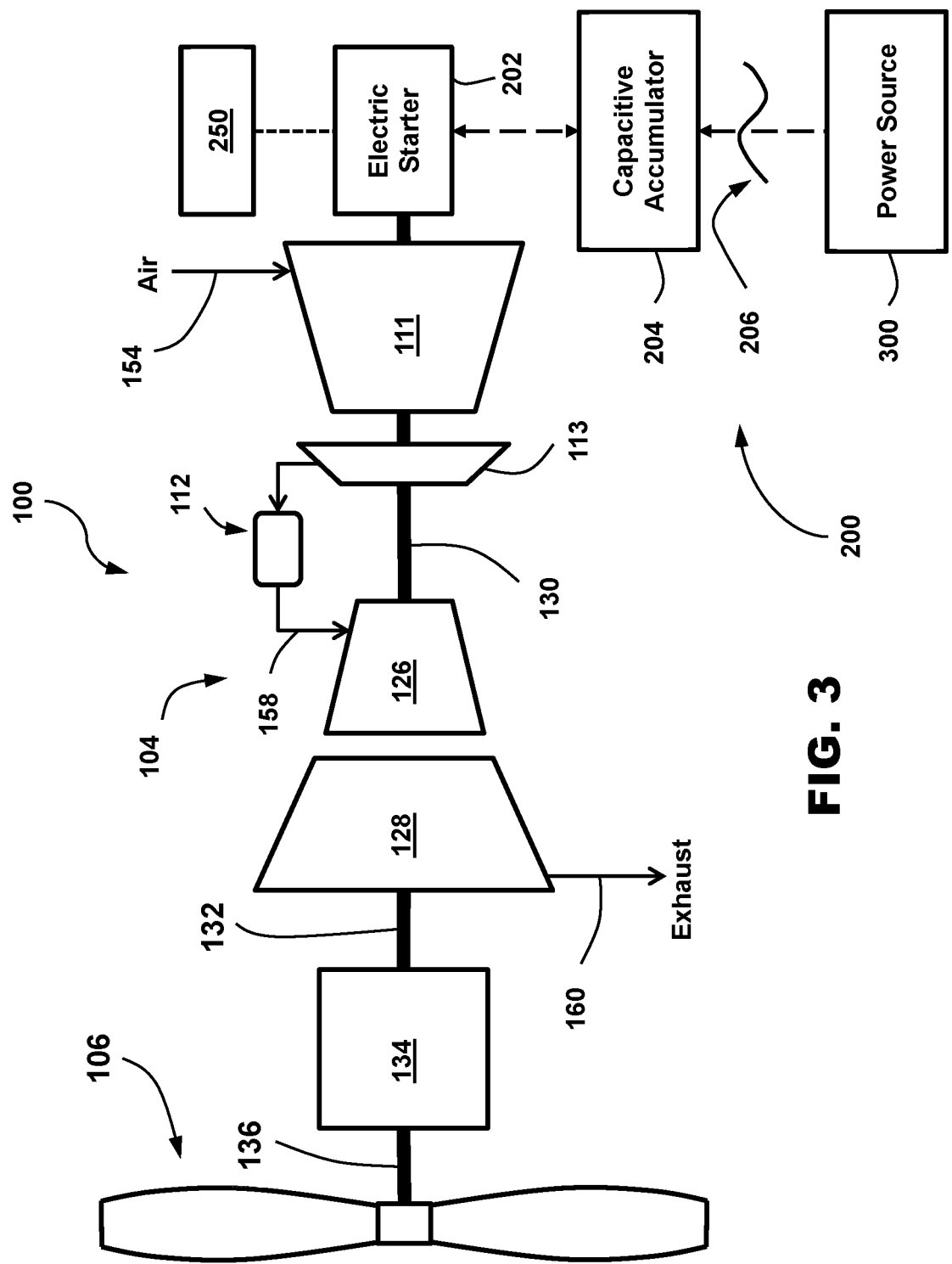
FIG. 3 provides a schematic view of the gas turbine engine of FIG. 1 depicting an exemplary starting system according to an exemplary embodiment of the present disclosure.

Referring still to FIG. 2, the core turbine engine 104 can include one or more shafts. For this embodiment, the gas turbine engine 100 includes a gas generator shaft 130 and a free or power shaft 132. The gas generator shaft 130 and the power shaft 132 are not connected to one another (FIG. 3). The gas generator shaft 130 drivingly couples the gas generator turbine 126 with the compressor section 110 to drive the rotational components of the compressor section 110. The power shaft 132 drivingly couples the power turbine 128 to drive a gear train 140 of the propeller gearbox 134, which in turn operatively supplies mechanical power to the propeller assembly 106 via a torque output or propeller shaft 136 at a reduced RPM. The forward end of the propeller shaft 136 includes a flange 137 that provides a mounting interface for the propeller assembly 106 to be attached to the core turbine engine 104.

The propeller gearbox 134 is enclosed within a gearbox housing 138. For this embodiment, the housing 138 encloses the epicyclical gear train 140 that includes a star gear 142 and a plurality of planet gears 144 disposed about the star gear 142. The planetary gears 144 are configured to revolve around the star gear 142. An annular gear 146 is positioned axially forward of the star and planetary gears 142, 144. As the planetary gears 144 rotate about the star gear 142, torque and power are transmitted to the annular gear 146. As shown, the annular gear 146 is operatively coupled to or otherwise integral with the propeller shaft 136. In some embodiments, the gear train 140 may further include additional planetary gears disposed radially between the plurality of planet gears 144 and the star gear 142 or between the plurality of planet gears 144 and the annular gear 146. In addition, the gear train 140 may further include additional annular gears.

As noted above, the core turbine engine 104 transmits power and torque to the propeller gearbox 134 via the power shaft 132. The power shaft 132 drives the star gear 142 which in turn drives the planetary gears 144 about the star gear 142. The planetary gears 144 in turn drive the annular gear 146, which is operatively coupled with the propeller shaft 136. In this way, the energy extracted from the power turbine 128 supports operation of the propeller shaft 136, and through the power gear train 140, the relatively high RPM of the power shaft 132 is reduced to a more suitable RPM for the propeller assembly 106.

In addition, the gas turbine engine 100 includes one or more controllers 250 that are operatively configured to control the core turbine engine 104 and the propeller assembly 106, such as e.g., the starting system of the gas turbine engine 100. For this embodiment, the controller 250 is a single unit equipped with Full Authority Digital Engine and Propeller Control (FADEPC) for providing full digital control of the core turbine engine 104 and the propeller assembly 106. In some alternative embodiments, the gas turbine engine 100 can include more than one controller for controlling the core turbine engine 104 and the propeller assembly 106. For example, in some exemplary embodiments, the gas turbine engine 100 can include an engine controller equipped with Full Authority Digital Engine Control (FADEC) and a propeller controller equipped with Full Authority Digital Propeller Control (FADPC). In such embodiments, the engine controller and the propeller controller are communicatively coupled.

The engine controller 250 can include any suitable hardware and/or software for controlling the gas turbine engine 100. As an example, the engine controller 250 can include one or more processors and one or more memory devices. The one or more memory devices can store data and instructions. When the instructions are executed by the one or more processors, the processors perform operations, such as e.g., performing the starting sequence of the gas turbine engine 100. For example, the controller 250 can send one or more control signals to a solenoid to close a starter circuit such that the starter draws power from a power source.

With reference to FIG. 1, during operation of the gas turbine engine 100, a volume of air indicated by arrow 148 passes across the plurality of propeller blades 150 circumferentially spaced apart from one another along the circumferential direction C and disposed about the axial direction A, and more particularly for this embodiment, the axial centerline 102. The propeller assembly 106 includes a spinner 163 aerodynamically contoured to facilitate an airflow through the plurality of propeller blades 150. The spinner 163 is rotatable with the propeller blades 150 about the axial direction A and encloses various components of the propeller assembly 106, such as e.g., the hub, propeller pitch actuator, piston/cylinder actuation mechanisms, etc. A first portion of air indicated by arrow 152 is directed or routed outside of the core turbine engine 104 to provide propulsion. A second portion of air indicated by arrow 154 is directed or routed through the annular inlet 120 of the gas turbine engine 100.

As shown in FIG. 2, the second portion of air 154 enters through the annular inlet 120 and flows downstream to the compressor section 110, which is a forward direction along the axial direction A in this embodiment. The second portion of air 154 is progressively compressed as it flows through the compressor section 110 downstream toward the combustion section 112.

The compressed air indicated by arrow 156 flows into the combustion section 112 where fuel is introduced, mixed with at least a portion of the compressed air 156, and ignited to form combustion gases 158. The combustion gases 158 flow downstream into the turbine section 114, causing rotary members of the turbine section 114 to rotate, which in turn supports operation of respectively coupled rotary members in the compressor section 110 and propeller assembly 106. In particular, the HPT 126 extracts energy from the combustion gases 158, causing the turbine blades to rotate. The rotation of the turbine blades of the HPT 126 causes the gas generator shaft 130 to rotate, and as a result, the rotary components of the compressor are rotated about the axial direction A. In a similar fashion, the power turbine 128 extracts energy from the combustion gases 158, causing the blades of the power turbine 128 to rotate about the axial direction A. The rotation of the turbine blades of the power turbine 128 causes the power shaft 132 to rotate, which in turn drives the power gear train 140 of the propeller gearbox 134. The propeller gearbox 134 in turn transmits the power provided by the power shaft 132 to the propeller shaft 136 at a reduced RPM and desired amount of torque. The propeller shaft 136 in turn drives the propeller assembly 106 such that the propeller blades 150 rotate about the axial direction A, and more particularly for this embodiment, the axial centerline 102 of the gas turbine engine 100. The exhaust gases, denoted by 160, exit the core turbine engine 104 through the exhaust outlets 122 to the ambient air.

It should be appreciated that the exemplary gas turbine engine 100 described herein is provided by way of example only. For example, in other exemplary embodiments, the engine may include any suitable number or types of compressors (such as e.g., reverse flow and/or axial compressors), turbines, shafts, stages, etc. Additionally, in some exemplary embodiments, the gas turbine engine may include any suitable type of combustor, and may not include the exemplary reverse-flow combustor depicted. It will further be appreciated that the engine can be configured as any suitable type of gas turbine engine, including, for example, turboshaft, turbojets, turbofan, etc. Moreover, in yet other embodiments, the engine can be configured as a reciprocating or piston engine. In addition, it will be appreciated that the present subject matter can be applied to or employed with any suitable type of propeller or fan configuration, including, for example, tractor and pusher configurations. Furthermore, although the gas turbine engine 100 described above is an aeronautical gas turbine engine for propulsion of a fixed-wing aircraft, the gas turbine engine can be configured as any suitable type of powerplant for use in any number of applications, such as wind turbine, marine applications, or auxiliary power units (APU) for a vehicle or power generation system.

FIG. 3 provides a schematic view of the powerplant of FIG. 1 depicting an exemplary starting system 200 according to an exemplary embodiment of the present disclosure. The starting system 200 is operatively configured to fast start the powerplant, which in this embodiment is the gas turbine engine 100 of FIGS. 1 and 2. As shown in FIG. 3, the starting system 200 includes an electric starter 202, a capacitive accumulator 204 and controller 250. The controller 250 is communicatively coupled with the electric starter 202 for controlling the electric starter 202. For instance, the controller 250 can control the electric starter 202 by closing the starter circuit to initiate an engine start operation.

The electric starter 202 is operatively configured to drive or rotate a shaft of the gas turbine engine 100 to a predetermined rotational speed such that the engine can spool up to operating speed. In the illustrated embodiment of FIG. 3, the electric starter 202 is operably coupled to the gas generator shaft 130 of the gas turbine engine 100. In this way, during an engine start operation, the electric starter 202 is operatively configured to drive the gas generator shaft 132 to a predetermined rotational speed (e.g., 10-15% of its maximum operating speed) such that the gas turbine engine 100 can operate without the assistance of the electric starter 202. In some exemplary embodiments, the predetermined rotational speed can be about 50% or more of the gas generator shaft's (or the shaft being driven by the electric starter 202) maximum operating speed. It will be appreciated that the electric starter 202 can be operably coupled with other shafts of the powerplant or gas turbine engine in alternative exemplary embodiments. For example, in a two-spool turbofan engine having a high pressure shaft and a low pressure shaft, the electric starter 202 can be operably coupled with the high pressure shaft.

For this embodiment, the electric starter 202 is a starter generator. Stated differently, electric starter 202 is an electrical machine that can function as an electric motor during starting operations (i.e., the electric starter 202 converts electrical energy into mechanical energy to drive or rotate the gas generator shaft 130) and can function as an electrical generator during normal operations (i.e., the electric starter 202 converts mechanical energy into electrical energy to power one or more systems of the engine or aircraft in which the engine is coupled).

A gear set or train can operably couple the electric starter 202 to the gas generator shaft 130. In some exemplary embodiments, the gear set can be selectively engageable with the gas generator shaft 130. In alternative exemplary embodiments, the gear set can be constantly engaged with the gas generator shaft 130. For instance, where electric starter 202 is operatively configured as an electric motor only, a clutch (not depicted) can be used to couple and decouple the electric starter 202 with the gas generator shaft 130. In embodiments where the electric starter 202 is operatively configured as a starter generator, the gear set can be constantly engaged with the gas generator shaft 130 such that the electric starter 202 is constantly coupled with the gas generator shaft 130. In this way, during normal operation, the electric starter 202 configured as an electric generator can rotate in unison with the gas generator shaft 130 such that electrical energy can be generated. In some exemplary embodiments, such as the illustrated embodiment of FIG. 3, the electric starter 202 can be operatively coupled with the gas generator shaft 130 in a direct drive configuration.

With reference still to FIG. 3, the starting system 200 also includes capacitive accumulator 204 located onboard the gas turbine engine 100 and in electrical communication with the electric starter 202. The capacitive accumulator 204 can be in electrical communication with the electric starter 202 by any suitable manner, such as e.g., one or more wired or wireless communication lines. The capacitive accumulator 204 can be a super capacitor, for example. In this way, the capacitive accumulator 204 can hold a significant charge. In some exemplary embodiments, the capacitive accumulator 204 can include a plurality of capacitors or super capacitors.

The capacitive accumulator 204 is operatively configured to quickly release or discharge a burst of electric power such that the gas turbine engine 100 can be fast started and brought up to speed quickly. More particularly, the capacitive accumulator 204 is configured to deliver a burst of power to the electric starter 202 such that the electric starter 202 can drive the gas generator shaft 130 to a sufficient rotational speed for starting the gas turbine engine 100. In some embodiments, the capacitive accumulator 204 provides sufficient electrical power to the electric starter 202 such that the gas turbine engine 100 is started within a matter of seconds, such as e.g., (3) three seconds, (5) five seconds, or (10) ten seconds.

The capacitive accumulator 204 can selectively discharge electric power to the electric starter 202. For example, the controller 250 can send one or more signals (i.e., current signals) to a starter solenoid to close the starter circuit such that the electric starter 202 can draw electric power from the capacitive accumulator 204. Stated differently, when the starter solenoid is controlled by the controller 250 to close the starter circuit, the capacitive accumulator 204 discharges electric power to the electric starter 202.

The capacitive accumulator 204 can be charge in a number of suitable manners. In some instances, for example, after the electric starter 202 has started the gas turbine engine 100 and switched or converted to an electrical generator, the electrical energy generated by the electric starter 202 can charge capacitive accumulator 204. That is, the electric starter 202 can convert the mechanical energy of the rotating gas generator shaft 130 into electrical energy and can charge the capacitive accumulator 204 with the extracted electrical energy. Once charged, the capacitive accumulator 204 can be used for load leveling when experiencing transient loads and may also be used for power conditioning. For example, the capacitive accumulator 204 can be used to prevent voltage droop during a midflight power change increase, such as e.g., step climbs or evasive maneuvers, or while the engine spools up. As another example, the capacitive accumulator 204 can be used to restart the gas turbine engine 100 midflight.

In some instances, an offboard or external power source 300 can be used to charge the capacitive accumulator 204. As used herein, offboard or external power source 300 means that the power source 300 is offboard of the gas turbine engine or vehicle to which the gas turbine engine is coupled. As shown in FIG. 3, when connected, the capacitive accumulator 204 can be in electrical communication with the power source 300. The external power source 300 can be any suitable type of power source, including e.g., a line voltage, one or more batteries, a remote power generation system, renewable technologies, etc. Moreover, in some exemplary embodiments, the power source 300 can be a mothership aircraft or vehicle.

As noted above, the external power source 300 is operatively configured to charge the capacitive accumulator 204. For instance, where the capacitive accumulator 204 is a low rate power source (e.g., a line voltage) and the power source 300 is in electrical communication with the capacitive accumulator 204, the power source 300 can charge the capacitive accumulator 204 with electrical energy at a low rate. The charge across the capacitive accumulator 204 can thus accumulate or increase over time. Once the capacitive accumulator 204 has obtained or reached a predetermined charge, the capacitive accumulator 204 can release the electrical energy at a high rate to charge the electric starter 202 to start the gas turbine engine 100 when controlled to do so. Because the capacitive accumulator 204 releases electrical energy at a high rate, the turbine engine can reach its operating speed very quickly. Charging the capacitive accumulator 204 with the external power source 300 and then using the capacitive accumulator 204 to deliver power to the electric starter 202 allows for a low wattage power source to start a turbine engine that has a high wattage start requirement.

In some exemplary embodiments, the capacitive accumulator 204 can be charged with the external power source 300 and then can be disconnected or disengaged from the external power source 300 (i.e., no longer in electrical communication), as denoted by 206 in FIG. 3. As the capacitive accumulator 204 retains its charge for a predetermined time, the capacitive accumulator 204 can deliver a burst of power to the electrical starter 204 even after being disconnected from the power source 300. This provides flexibility as to the location of the engine start. Moreover, the capacitive accumulator 204 allows a turbine engine to have fast start capability without being connected to a significant offboard power source capable of delivering a burst of power sufficient to start the engine and without assistance from large onboard energy storage/generation devices, thereby reducing the weight of the engine.

Utilizing capacitive accumulator 204 to deliver high bursts of electric power to electric starter 202 provides numerous advantages. For instance, by utilizing capacitive accumulator 204 to deliver a high burst of power to the electric starter 202, as noted above, the weight of the gas turbine engine 100 can be reduced as the power density (W/kg) of a capacitive accumulator 204 is much better than other energy storage devices, such as e.g., batteries. Moreover, as the capacitive accumulator 204 is able to deliver significant power bursts to the electric starter 202, faster starts can be achieved. This effectively improves the gas turbine engine's ability to reach an operating point more quickly. Also, use of the capacitive accumulator 204 allows for fast traverses of rotordynamic modes and reduces wear on various components of the gas turbine engine 100, such as e.g., air bearings. Additionally, due to the burst of power provided by the capacitive accumulator 204 to the electric starter 202, the electric starter 202 is able to drive the gas generator shaft 130 with increased torque. Increased torque helps overcome starting drag for air bearing systems. In addition, capacitive storage capacity is less expensive per watt of peak draw and lower weight per watt of peak draw compared to conventional energy storage system, resulting in a less expensive starter system. Yet another advantage of utilizing capacitive accumulator 204 to power electric starter 202 is that capacitive accumulators, such as super capacitors, have better shelf stability than conventional energy storage systems. Accordingly, such capacitive accumulators can have increased service lives.

In one exemplary embodiment, the gas turbine engine 100 of FIG. 3 can be started as follows. The capacitive accumulator 204 is first charged by the external power source 300 to a predetermined charge. For this embodiment, the power source 300 is disposed offboard of the vehicle (FIG. 5) to which the gas turbine engine 100 is coupled. Moreover, the power source 300 is a low rate line voltage in this embodiment. Once the capacitive accumulator 204 is charged to a predetermined charge, the capacitive accumulator 204 is disconnected from the power source 300 such that the capacitive accumulator 204 and the power source 300 are no longer in electrical communication (i.e., an electrical connector in electrical communication with the capacitive accumulator 204 is unplugged from the line voltage). Thereafter, the gas turbine engine 100 can be started.

In particular, an engine start operation can be initiated by an operator of the vehicle or by a control system. Upon initiating the engine start operation, the controller 250 sends one or more signals to a starter solenoid of the starter circuit or the electric starter 202 can be driven by a control system, such as e.g., a variable frequency drive. The one or more signals cause the starter circuit to close. When the starter circuit is closed, the capacitive accumulator 204 discharges at least a portion of the predetermined charge to deliver an amount of electrical power to the electric starter 202. The electric power discharged from the capacitive accumulator 204 can be delivered to the electric starter 202 at a high rate (i.e., a burst of electrical power). The burst of electrical power causes the electric starter 202 to drive or rotate a shaft of the gas turbine engine 100, which in this embodiment is the gas generator shaft 130. Moreover, for this embodiment, the amount of electric power delivered to the electric starter 202 is an amount that causes the electric starter 202 to drive the shaft to a predetermined rotational speed. As the shaft spools up to the predetermined rotational speed, the LPC 111 and the HPC 113 begin to progressively compress the airflow 154 entering the gas turbine engine 100 and the gas generator turbine 126 begins to rotate as well. One or more fuel nozzles of the combustion section 112 then release an amount of fuel to mix with the compressed air to create combustion gasses 158, which in turn drives the gas generator turbine 126 and the power turbine 128 up to operating speed such that the gas turbine engine 100 can ultimately reach operating speed. As noted above, the predetermined rotational speed is a speed of the shaft in which the electric starter 202 is no longer needed to sustain operation of the gas turbine engine 100.

After the electric starter 202 has started the gas turbine engine 100, the electric starter can convert into an electric generator for power generation. The electric starter 202 can immediately convert into an electric generator or can do so after a predetermined time. In some embodiments, for example, the electric starter 202 acting as an electric generator can recharge the capacitive accumulator 204. In this way, the capacitive accumulator 204 can be used for load leveling, power conditioning, and in some instances, the capacitive accumulator 204 can be used to restart the engine mid transport. Moreover, the capacitive accumulator 204 can be used to supply electrical power bursts to high wattage systems or loads that need intermittent power that exceeds the capability of one or more generators of the gas turbine engine 100.

In some exemplary embodiments, after the capacitive accumulator 204 has discharged at least a portion of its predetermined charge to deliver an amount of electrical power to the electric starter 202, the capacitive accumulator 204 can be detached from the powerplant (i.e., the gas turbine engine 100 in this embodiment) such that the capacitive accumulator 204 is no longer onboard the vehicle or powerplant. For example, the capacitive accumulator 204 can be dropped overboard. In this way, after a starting operation, the weight of the powerplant can be reduced, thereby increasing the efficiency of the powerplant during operation. For instance, as shown in FIG. 2, the capacitive accumulator can be stored within a housing 208. The housing 208 can be operatively coupled to the gas turbine engine 100 during the starting operation and can be operatively configured to detach upon the happening of a particular event or condition. For example, upon the shaft of the engine reaching a predetermined rotational speed, the controller 250 can send one or more signals to a decoupler, separator, etc. or a combination thereof to release the housing 208 and capacitive accumulator 204 disposed therein. Alternatively, as noted above, after the gas turbine engine 100 has been started with the assistance of the capacitive accumulator 204, the capacitive accumulator 204 can remain attached to the gas turbine engine 100 or vehicle for future reuse.

In some exemplary embodiments, the capacitive accumulator 204 can be modular. For instance, the capacitive accumulator 204 can be removed from the gas turbine engine 100 and charged by a suitable power source 300, such as e.g., a capacitor bank. The capacitive accumulator 204 can then be installed prior to starting the gas turbine engine 100.

Figure 4:
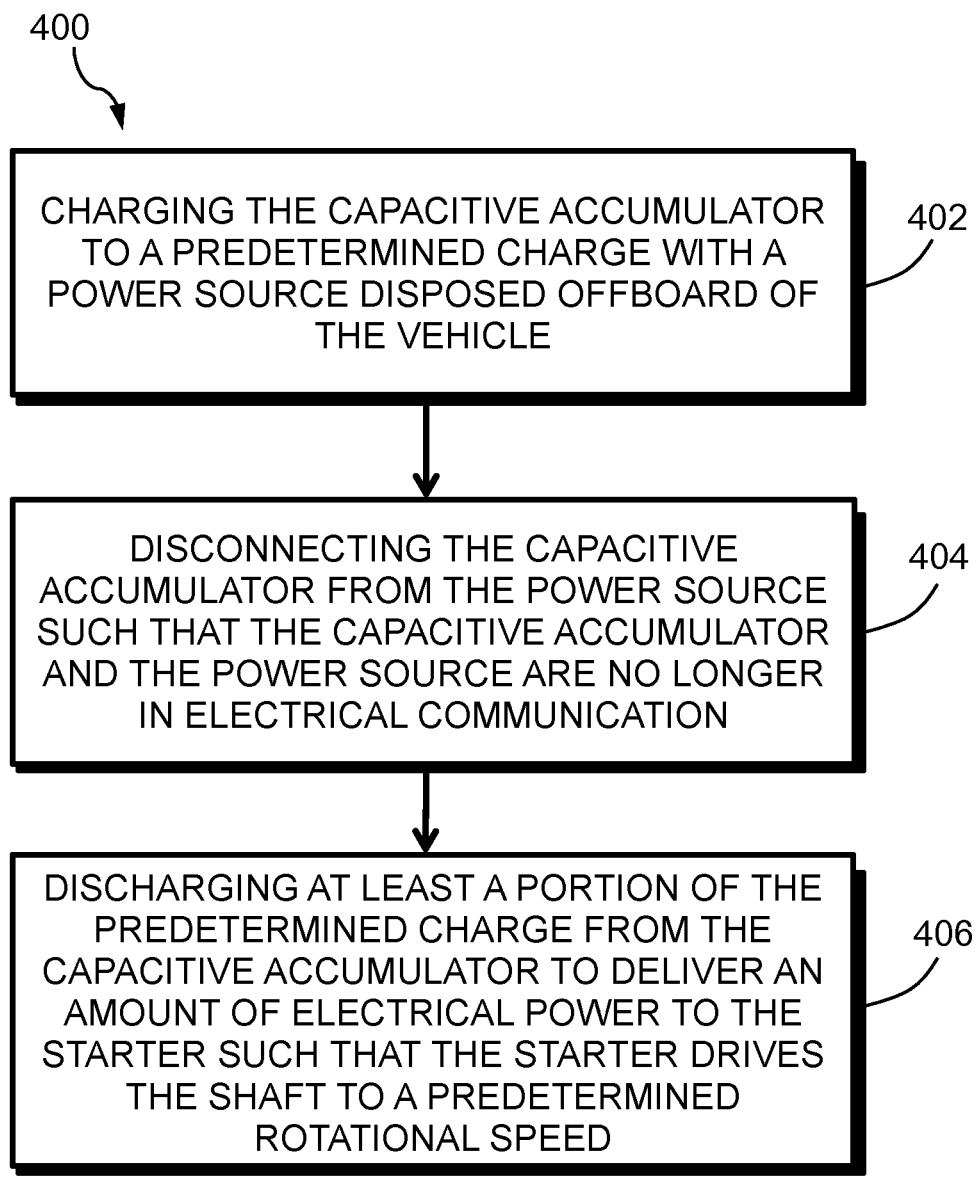
FIG. 4 provides a flow diagram of an exemplary method according to exemplary embodiments of the present disclosure.

FIG. 4 provides a flow diagram of an exemplary method (400) for fast starting a powerplant for a vehicle according to exemplary embodiments of the present disclosure. Some or all of the method (400) can be implemented by the starting system 200 illustrated and described herein in FIGS. 1-3 and the accompanying text. In such implementations, the powerplant can include a starter and a capacitive accumulator in electrical communication with the starter. Moreover, the powerplant further includes a shaft operably coupled with the starter.

At (402), exemplary method (400) includes charging the capacitive accumulator to a predetermined charge with a power source disposed offboard of the vehicle. For instance, the capacitive accumulator 204 of the powerplant can be charged with the external power source 300 disposed offboard of the vehicle. The predetermined charge can be a charge sufficient to start the powerplant under a fast start requirement. In alternative embodiments, the predetermined charge can be a charge sufficient to start the powerplant. The capacitive accumulator can be a super capacitor, for example. The powerplant can be a turbine engine for an aircraft, for example. For example, the powerplant can be a turboprop engine for propulsion of a fixed-wing aircraft as shown in FIGS. 1-3. As another example, the gas turbine engine 100 can be a turboshaft engine for propulsion of a rotor aircraft. As yet another example, the gas turbine engine 100 can be a small turbine engine for propulsion of an unmanned aerial vehicle. In yet a further example, the gas turbine engine 100 can be a turbine engine for a power generation system. As yet another example, the gas turbine engine 100 can be a micro auxiliary power unit (APU) for an aircraft or other vehicle.

At (404), exemplary method (400) includes disconnecting the capacitive accumulator from the power source such that the capacitive accumulator and the power source are no longer in electrical communication. For instance, the capacitive accumulator 204 of the powerplant can be disconnected from the external power source 300 such that they are no longer in electrical communication. Disconnecting the capacitive accumulator 204 from the external power source 300 can mean physically disconnecting the two (i.e., physically disconnecting the electrical connectors coupling the capacitive accumulator 204 with the external power source 300) or inductively or wirelessly disconnecting the capacitive accumulator 204 from the external power source 300 (i.e., moving the capacitive accumulator 204 out of range of the external power source 300).

By removing the disconnecting the capacitive accumulator 204 from the external power source 300, the external power source 300 ceases charging the capacitive accumulator 204. However, as the capacitive accumulator 204 is able to hold its charge over a predetermined period of time, the capacitive accumulator 204 can still provide a burst of electric power to the electric starter 202. In this way, the powerplant can have fast start capability even without being connected to an external power source and without a large onboard battery or other energy storage device typically needed for fast starting of a powerplant.

At (406), exemplary method (400) includes discharging at least a portion of the predetermined charge from the capacitive accumulator to deliver an amount of electrical power to the starter such that the starter drives the shaft to a predetermined rotational speed. For example, after the capacitive accumulator 204 is charged with a predetermined charge and then subsequently disconnected from the external power source 300, the capacitive accumulator 204 can discharge or deliver a burst of electric power to the electric starter 202 such that the powerplant can be started. However, as the capacitive accumulator 204 can hold a sufficient charge for a predetermined amount of time (i.e., the charge across the capacitive accumulator 204 dissipates over time), the powerplant is best started within a predetermined time. In this way, the capacitive accumulator 204 can deliver a sufficient amount of power to the electric starter 202. In such an implementation, a powerplant can be started without being in electrical communication with an external power source and without a relatively large or heavy onboard energy storage device. In this way, better powerplant efficiency can be achieved.

In some exemplary implementations, the method further includes discharging at least a portion of the predetermined charge from the capacitive accumulator to deliver an amount of electrical power to one or more starter modules such that powerplant can be started. For instance, after the capacitive accumulator 204 is charged with a predetermined charge and then subsequently disconnected from the external power source 300, in addition to discharging at least a portion of the predetermined charge to the electric starter 202, the capacitive accumulator 204 can discharge or deliver a burst of electric power to one or more starter modules such that the powerplant can be started. Starter modules can include, for example, a fuel system for delivering an amount of fuel to the combustion chamber of the powerplant, a control system of the vehicle or powerplant, one or more other electrical systems required for a starting operation, a combination of the foregoing, etc.

In some exemplary implementations, the starter is a starter generator. For instance, electric starter 202 can be a starter generator switchable between an electric motor and an electric generator. In such implementations, after the starter drives the shaft to the predetermined rotational speed, the method further includes switching the starter generator into an electric generator. In addition, the method further includes recharging the capacitive accumulator to a predetermined charge. For instance, as the electric starter 202 rotates about the axial direction A in unison with the gas generator shaft 130 (in direct drive configurations), the electric starter 202, acting as an electric generator, converts mechanical energy into electrical energy. When the electric starter 202 and the capacitive accumulator 204 are in electrical communication, the generated electric energy can be used to charge the capacitive accumulator 204. In some exemplary implementations, after recharging, the method further includes discharging at least a portion of the predetermined charge from the capacitive accumulator to deliver an amount of electrical power to one or more systems of the vehicle. For example, the capacitive accumulator 204 can discharge at least a portion of its predetermined charge to deliver an amount of power to avionics, actuators, other electrical loads on the powerplant, other electrical loads on the vehicle, other electrical loads of any carried payload, or a combination of the foregoing. In yet further exemplary implementations, after recharging, the method further includes discharging at least a portion of the predetermined charge from the capacitive accumulator to deliver an amount of electrical power to a second vehicle. For example, the vehicle can be a mothership. The second vehicle can be a vehicle configured to dock or otherwise selectively attached or couple the mothership. The capacitive accumulator 204 can discharge at least a portion of its predetermined charge to deliver an amount of power to the second vehicle or to multiple other vehicles. For instance, the capacitive accumulator 204 can discharge at least a portion of its predetermined charge to deliver an amount of power to the second vehicle when the second vehicle is docked to the vehicle (i.e., the mothership).

In some exemplary implementations, after the capacitive accumulator is disconnected from the power source, the starter draws electrical power only from the capacitive accumulator to start the powerplant. This may, for example, save other onboard storage devices (e.g., batteries) for propelling the vehicle during normal operation. Moreover, in some embodiments, the capacitive accumulator can be the only electrical power source onboard the vehicle.

In some exemplary implementations, after discharging, the method further includes detaching the capacitive accumulator from the powerplant such that the capacitive accumulator is no longer onboard the vehicle or powerplant. In such implementations, by detaching the capacitive accumulator and its related components (e.g., the housing 208), the powerplant can achieve better efficiency due to the decreased weight. Detaching or decoupling the capacitive accumulator from the powerplant can be particularly advantageous for unmanned aerial vehicles performing a one-way, long range mission, for example.

Figure 5:
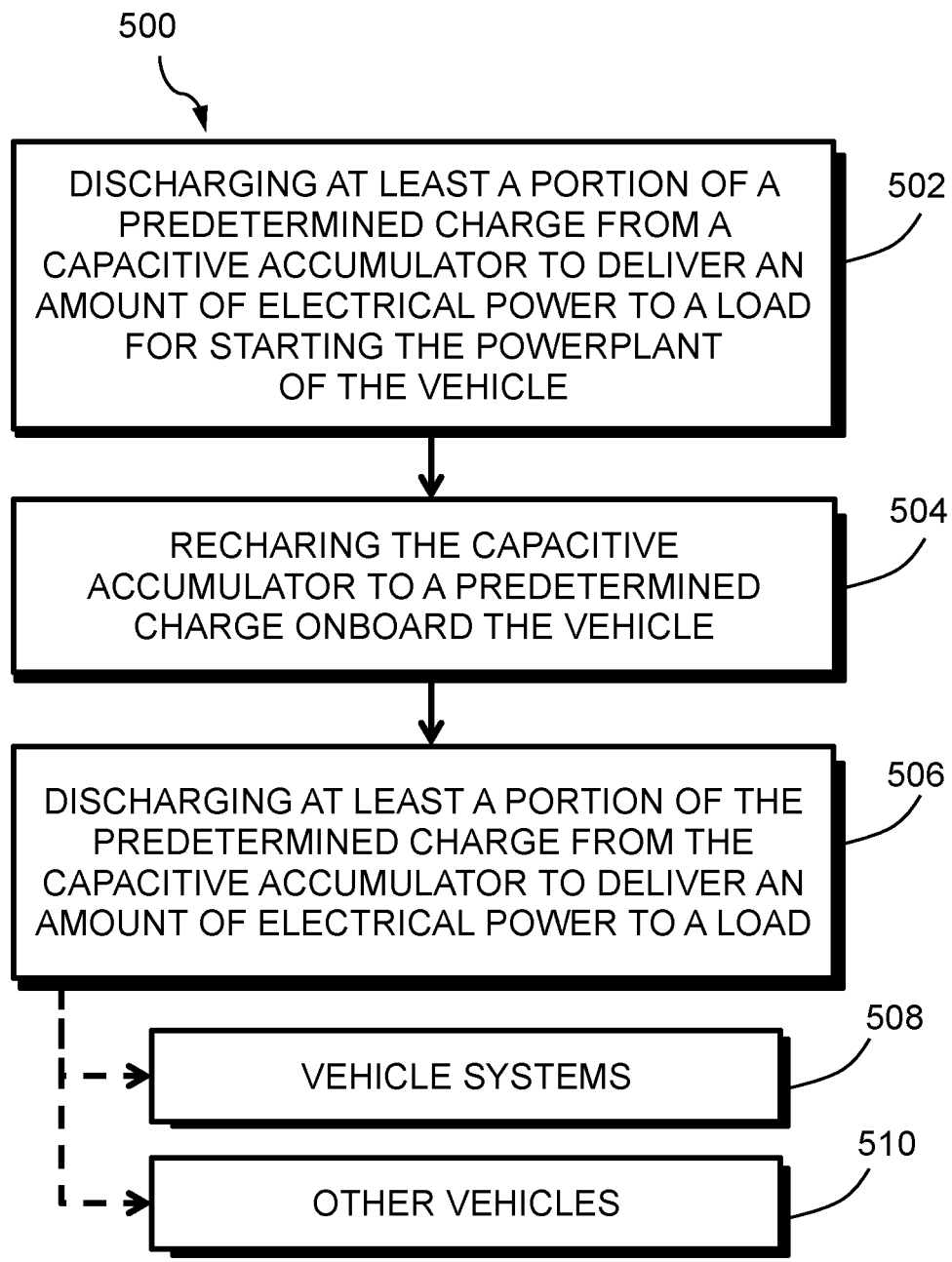
FIG. 5 provides a flow diagram of an exemplary method according to exemplary embodiments of the present disclosure.

FIG. 5 provides a flow diagram of an exemplary method according to exemplary embodiments of the present disclosure. In particular, FIG. 5 provides a method (500) for powering one or more electrical loads after starting a powerplant of a vehicle. Some or all of the method (500) can be implemented by the starting system 200 illustrated and described herein in FIGS. 1-3 and the accompanying text. In such implementations, the powerplant can include a starter and a capacitive accumulator in electrical communication with the starter. Moreover, the capacitive accumulator can be in electrical communication with one or more vehicle electrical systems or other vehicles.

At (502), exemplary method (500) includes discharging at least a portion of a predetermined charge from a capacitive accumulator to deliver an amount of electrical power to a load for starting the powerplant of the vehicle. For instance, the capacitive accumulator 204 can discharge at least a portion of its predetermined charge to deliver an amount of power to the electric starter 202.

At (504), exemplary method (500) includes recharging the capacitive accumulator to a predetermined charge onboard the vehicle. For example, the electric starter 202 can be a starter generator, and after the electric starter 202 starts the powerplant, the electric starter 202 can switch to an electric generator. During operation of the powerplant, the electric starter 202, acting as an electric generator, can recharge the capacitive accumulator 204. The capacitive accumulator 204 can be recharged by other suitable power generation sources as well. For instance, the capacitive accumulator 200 for can be recharged by one or more batteries or energy storage devices.

At (506), exemplary method (500) includes discharging at least a portion of the predetermined charge from the capacitive accumulator to deliver an amount of electrical power to a load. For example, at (508), the capacitive accumulator 204 can discharge at least a portion of the predetermined charge to deliver an amount of electrical power to one or more vehicle electrical systems. For instance, the vehicle electrical system could be the electric starter 202. In this way, the capacitive accumulator 204 can restart the powerplant midflight. As another example, the capacitive accumulator 204 can deliver electrical power to avionics, actuators, direct energy weapon systems, other electrical loads on the vehicle, or a combination of the foregoing. As yet another example, at (510), the capacitive accumulator 204 can discharge at least a portion of the predetermined charge to deliver an amount of electrical power to one or more other vehicles. For example, the vehicle that includes the capacitive accumulator 204 can be a mothership. The other vehicles can be vehicles configured to dock or otherwise selectively attached or couple the mothership. The capacitive accumulator 204 can discharge at least a portion of its predetermined charge to deliver an amount of power to the other vehicles. In this way, the other vehicles can be started or otherwise powered.

Figure 6:
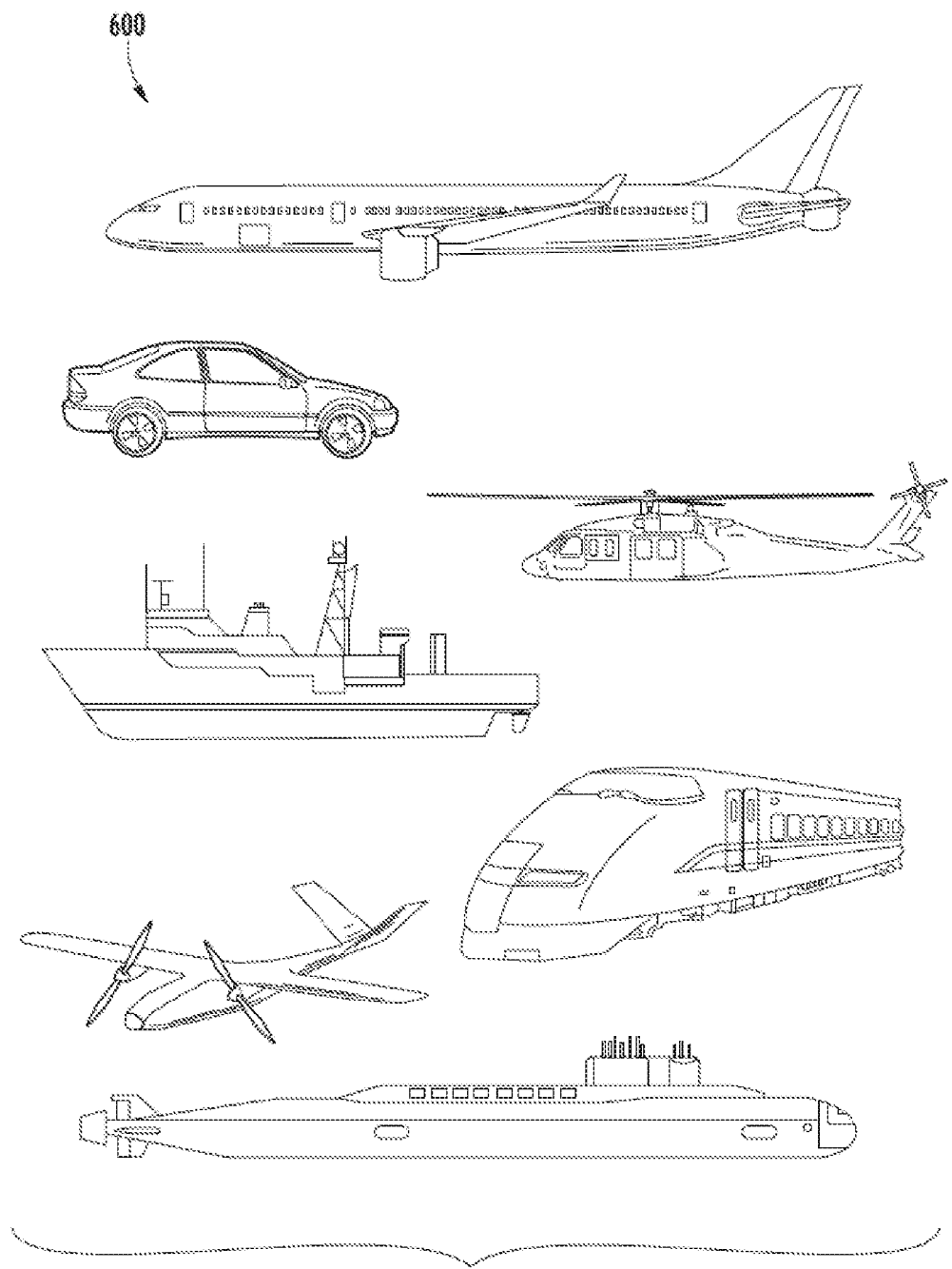
FIG. 6 depicts example vehicles according to example embodiments of the present disclosure.

Referring now to FIG. 6, example vehicles 600 according to example embodiments of the present disclosure are depicted. The systems and methods of the present disclosure can be implemented on an aircraft, helicopter, automobile, boat, submarine, train, unmanned aerial vehicle or drone and/or any other suitable vehicles. While the present disclosure is described herein with reference to an aircraft implementation, this is intended only to serve as an example and not to be limiting. One of ordinary skill in the art would understand that the systems and methods of the present disclosure can be implemented on other vehicles without deviating from the scope of the present disclosure.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for fast starting a powerplant of a first vehicle, the method comprising:
charging a capacitive accumulator disposed onboard the first vehicle to a predetermined charge with a power source disposed offboard of the first vehicle;
disconnecting the capacitive accumulator from the power source such that the capacitive accumulator and the power source are no longer in electrical communication;
discharging at least a portion of the predetermined charge from the capacitive accumulator to deliver a first amount of electrical power to a starter/generator of the powerplant such that the starter/generator drives a shaft of the powerplant to a predetermined rotational speed;
after the starter/generator drives the shaft to the predetermined rotational speed, switching the starter/generator to generate electrical power;
recharging, by the starter/generator, the capacitive accumulator to a second predetermined charge; and
discharging at least a portion of the second predetermined charge from the capacitive accumulator to deliver a second amount of electrical power to a second vehicle.

2. The method of claim 1, wherein after the capacitive accumulator is disconnected from the power source, the starter/generator draws electrical power only from the capacitive accumulator to start the powerplant.

3. The method of claim 1, wherein after discharging the at least a portion of the second predetermined charge from the capacitive accumulator to deliver the second amount of electrical power to the second vehicle, the method further comprises: detaching the capacitive accumulator from the powerplant such that the capacitive accumulator is no longer onboard the first vehicle or the powerplant.

4. The method of claim 1, wherein after recharging, the method further comprises: discharging at least a portion of the second predetermined charge from the capacitive accumulator to deliver a third amount of electrical power to one or more systems of the first vehicle.

5. The method of claim 1, wherein the powerplant is a turbine engine.

6. The method of claim 1, wherein the first vehicle is an unmanned aerial vehicle.

7. The method of claim 1, wherein the capacitive accumulator is a super capacitor.

8. The method of claim 1, wherein the power source is a line voltage.

9. The method of claim 1, wherein the power source is a mothership vehicle.

10. The method of claim 1, wherein the predetermined rotational speed is a speed at which the starter/generator is no longer needed to sustain operation of the powerplant.

11. The method of claim 1, wherein during discharging the at least a portion of the predetermined charge from the capacitive accumulator to deliver the first amount of electrical power to the starter/generator of the powerplant, at least a portion of the predetermined charge from the capacitive accumulator is discharged to deliver an additional amount of electrical power to one or more starter modules.

12. The method of claim 1, wherein the capacitive accumulator is a modular capacitive accumulator that is removable from and installable on the first vehicle.

13. The method of claim 1, wherein the capacitive accumulator is the only electrical power source onboard the first vehicle.

* * * * *